(12) United States Patent
Christmann et al.

(10) Patent No.: US 9,255,582 B2
(45) Date of Patent: Feb. 9, 2016

(54) EXHAUST-GAS TURBOCHARGER FOR USE WITH AN INTERNAL COMBUSTION ENGINE

(71) Applicant: BorgWarner Inc., Auburn Hills, MI (US)

(72) Inventors: Ralf Christmann, Kaiserslautern (DE); Sebastian Vorlaeufer, Winnweiler (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/984,497

(22) PCT Filed: Feb. 22, 2013

(86) PCT No.: PCT/US2013/027208
§ 371 (c)(1),
(2) Date: Aug. 8, 2013

(87) PCT Pub. No.: WO2013/133986
PCT Pub. Date: Sep. 12, 2013

(65) Prior Publication Data
US 2015/0233381 A1    Aug. 20, 2015

(30) Foreign Application Priority Data
Mar. 7, 2012  (DE) .......................... 10 2012 203 624

(51) Int. Cl.
*F04D 27/00* (2006.01)
*F02B 47/08* (2006.01)
(Continued)

(52) U.S. Cl.
CPC .............. *F04D 27/009* (2013.01); *F02B 47/08* (2013.01); *F04D 17/00* (2013.01); *F04D 25/045* (2013.01)

(58) Field of Classification Search
CPC .......................... F04D 27/009; F02B 37/186
See application file for complete search history.

(56) References Cited

U.S. PATENT DOCUMENTS

RE31,013 E  *  8/1982  Smith, Jr. .................. 403/27
4,656,834 A     4/1987  Elpern
(Continued)

FOREIGN PATENT DOCUMENTS

KR    20-19980020499         7/1998
KR    2019980020499 U        7/1998
(Continued)

OTHER PUBLICATIONS

KIPO Authorized Officer Joong Sub Han, PCT International Search Report and Written Opinion for International Application No. PCT/US2013/027208 mailed Jun. 17, 2013, 11 pages.
International Preliminary Report on Patentability in PCT/US2013/027208 issued on Sep. 18, 2014, 8 pages.

*Primary Examiner* — Richard Edgar
(74) *Attorney, Agent, or Firm* — Fish & Richardson P.C.

(57) ABSTRACT

The present invention relates to an exhaust-gas turbocharger for use in an internal combustion engine and to a method for assembling and/or setting an exhaust-gas turbocharger. According to the invention, the exhaust-gas turbocharger comprises a regulating mechanism and an actuator device for actuating the regulating mechanism, wherein the actuator device comprises a control rod with a first part and a second part. The second part of the control rod has a guide, which is designed in such a way that it at least partially surrounds the first part. Moreover, the second part has at least one hole, wherein the first part is connected to the second part by a welded or assembly joint, which is arranged in the at least one hole.

16 Claims, 3 Drawing Sheets

(51) Int. Cl.
  *F04D 25/04*  (2006.01)
  *F04D 17/00*  (2006.01)

(56) References Cited

U.S. PATENT DOCUMENTS 6,079,210 A   6/2000  Pintauro et al.

8,578,712 B2 * 11/2013  Natali ............................. 60/602

FOREIGN PATENT DOCUMENTS

| KR | 10-20020046542 | 6/2002 |
| KR | 1020020046542 A | 6/2002 |
| WO | 2010149442 A1 | 12/2010 |
| WO | 2011087939 A2 | 7/2011 |

* cited by examiner

(Stand der Technik)

EXHAUST-GAS TURBOCHARGER FOR USE WITH AN INTERNAL COMBUSTION ENGINE

CROSS-REFERENCE TO RELATED APPLICATIONS

This application is a National Stage application under 35 U.S.C. 371 of International Application No. PCT/US2013/027208, having an International Filing Date of Feb. 22, 2013, which claims the benefit of DE Application No. 102012203624.5 filed Mar. 7, 2012. The contents of the above applications are hereby incorporated by reference in their entirety.

FIELD OF THE INVENTION

The present invention relates to a turbocharger, in particular for use with an internal combustion engine and to a method for assembling and setting a turbocharger.

BACKGROUND OF THE INVENTION

DE 10 2007 018 618 A1 describes the widely known construction of a turbocharger for an internal combustion engine. This turbocharger consists essentially of a radial turbine with a turbine wheel and of a radial compressor coupled to the turbine wheel by a shaft and having a compressor impeller. The turbine wheel is driven by the exhaust-gas flow from the internal combustion engine and, via the shaft, drives the compressor impeller, which is arranged in the intake section of the internal combustion engine. This type of turbocharger is generally used to boost the power of internal combustion engines.

To regulate the turbine, the exhaust-gas flow which is passed through the turbine can be adjusted. A bypass is arranged on the turbine side for adjustment of the exhaust-gas flow, allowing at least some of the exhaust gas to be directed past the turbine. The quantity of diverted exhaust gas is regulated by a regulating mechanism, e.g. by a "waste gate valve" (or bypass valve). In certain conditions, this mechanism guides some of the exhaust gases through the bypass, around the turbine and directly into the exhaust. It is thereby possible, for example, to prevent an excessive rotational speed of the turbocharger and mechanical or thermal overloading of the internal combustion engine.

The regulating mechanism can be controlled by means of an actuator device. This generally comprises a control rod for transmitting force or movement within the regulating mechanism. There is a wide variety of design variants for coupling the control rod and the valve.

Figure 3:
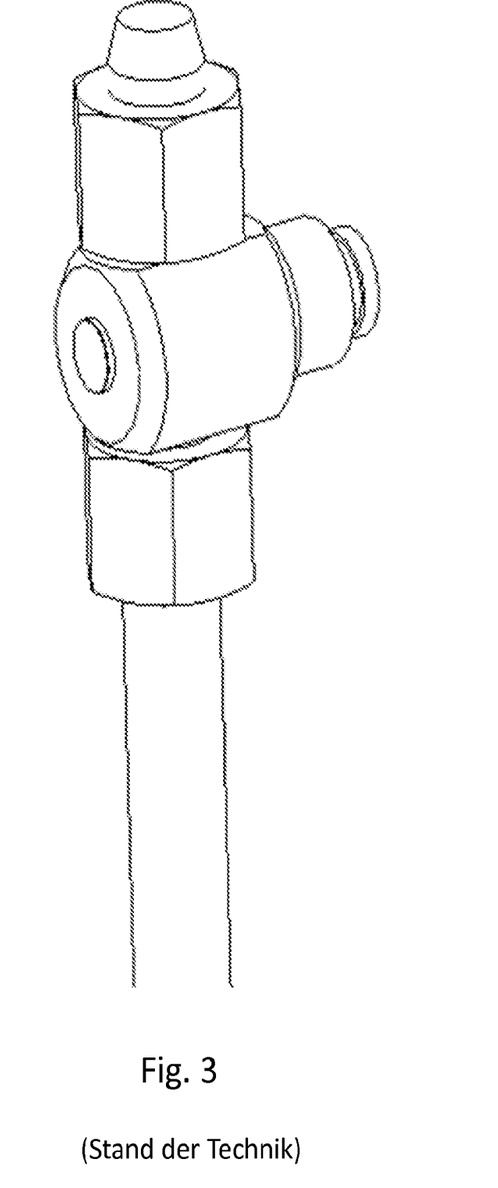
FIG. 3 shows one embodiment of control rods in accordance with the prior art.

During the assembly of the turbocharger, the regulating mechanism is generally set manually. As is known from DE 10 2007 018 618 A1 or indeed from EP 1949926, the control rod can be coupled adjustably to the valve. This can be achieved, for example, by means of a thread on the control rod and a corresponding counterpart in the coupling mechanism (see FIG. 3). The problem with this procedure and this design is that there is no security against interference with the regulating mechanism. Thus, for example, the setting of the turbocharger can be changed by the end-user simply by adjusting the adjustable connection between the control rod and the coupling mechanism in order, for example, to achieve a higher engine power. In the event of damage to the turbocharger or to the internal combustion engine resulting therefrom, unauthorized modification, for example by the end-user, is very difficult to prove. Thus, damage arising from negligent action can lead to unjustified warranty claims. It is important to avoid such subsequent adjustment. Moreover, it is important to optimize the conditions for the installation and setting of a turbocharger, e.g. by improving the position and alignment of the regulating mechanism in respect of assembly and setting or fixing. This can allow the use of robots or other automation measures, for example. Another factor are the relatively high costs involved in producing the prior art solutions for adjustable regulating mechanisms by means of threaded rods or other screw-type solutions (see FIG. 3).

ABSTRACT OF THE INVENTION

The present invention relates to a turbocharger as claimed in claim 1. The present invention furthermore relates to an internal combustion engine as claimed in claim 15 and to a method for setting a turbocharger as claimed in claim 16. The dependent claims relate to advantageous embodiments of the present invention.

The exhaust-gas turbocharger of the present invention is for use with an internal combustion engine and comprises a regulating mechanism and an actuator device for actuating the regulating mechanism, wherein the actuator device comprises a control rod with a first part and a second part. The second part of the control rod has a guide, which is designed in such a way that it at least partially surrounds the first part. Moreover, the second part has at least one hole, wherein the first part is connected to the second part by a welded or assembly joint, which is arranged in the at least one hole. Connecting the first part to the second part by means of a permanent welded joint or some other assembly joint makes it possible to prevent subsequent adjustment of the two parts relative to one another. It is thereby possible to prevent unwanted overloading of the turbocharger and the internal combustion engine.

In the case of the advantageous embodiments of the hole which are described below, it should be assumed that these embodiments can also apply to two or more holes.

According to one aspect of the invention, the at least one hole can be arranged in the region of the guide. The second part of the control rod can comprise at least two holes, i.e. two, three or more holes, and a welded or assembly joint can be arranged in each of the holes, or a welded or assembly joint can extend across all the holes, with the holes optionally being arranged on an axis parallel to the longitudinal axis of the first part.

According to another aspect of the invention, the at least one hole can be an elongate hole. The longitudinal axis of the elongate hole can run parallel to the longitudinal axis of the first part.

According to another aspect of the invention, the second part can comprise a connection. This can be used to connect the control rod to further elements of the regulating mechanism. The connection can be arranged on the opposite side of the second part from the guide. The connection can have a connection hole with a center line. Provision is advantageously made for the connection to comprise a flexible connection or a bearing for a ball joint, thereby allowing an appropriate connection to further elements of the regulating mechanism, e.g. a coupling device.

According to another aspect of the invention, the center of the hole or the centers of the holes can lie in a plane defined by the center line of the connection hole and the longitudinal axis of the first part. In an alternative embodiment, the center of the hole or the centers of the holes can lie in a plane which is perpendicular to the center line through the connection hole and which contains the longitudinal axis of the first part. By means of this arrangement of the hole or holes for the weld, simple and at least partially automated assembly, setting and fixing can be made possible. It is thus possible to reduce costs for manual assembly and setting.

As an advantageous option, provision can be made for the guide to fix the position of the first part relative to the second part, except for a degree of freedom parallel to the longitudinal axis of the first part. This allows the first part to be moved relative to the second part, parallel to the longitudinal axis of the first part, with simultaneous support of the first part by the guide of the second part. This facilitates the process of setting and fixing the two parts by means of the welded or assembly joint. As an advantageous option, the first part can be embodied as a metal sheet, a polygonal bar or a round bar. The guide can be of sleeve-shaped design, with the sleeve-shaped guide optionally surrounding one region of the first part completely.

According to another aspect of the invention, the second part can be produced from a stamping or a stamped and bent part. The second part can be produced by bending around an axis perpendicular to the longitudinal axis of the first part. After the bending operation, the guide can be formed by an upper side and a lower side of the second part.

As an alternative, the second part can be produced by bending twice around two axes that are perpendicular to one another or by bending it several times around various differently aligned axes. Provision is advantageously made for the second part to be fixed by means of at least one assembly joint after the bending operation. The assembly joint can be either a riveted joint, a screwed joint, a lock-seamed joint, an adhesively bonded joint, a soldered joint or a welded joint. The welded joint can be a laser-welded joint, an arc-welded joint, a resistance-welded joint, an electron beam-welded joint or a diffusion-welded joint or some other welded joint known in the prior art. Provision is advantageously made for the at least one assembly joint to be arranged in an area around the connection but not in the area around the guide. On the one hand, this makes it possible to save on material for the second part and, on the other hand, this arrangement allows positioning of the hole or holes at a particular location in the overall area of the guide. In the case of a sleeve-shaped design of the guide, for example, the (elongate) hole can be positioned in any desired location that is optimized for the assembly, the setting and the fixing of the regulating mechanism. The at least one hole can be machined directly into the stamping. This makes it possible to simplify the production process for the second part. In this case, the at least one hole can be fully formed even before a bending operation, by punching or drilling the complete hole, for example. As an alternative, the at least one hole can also consist of two halves, with two edge regions of the second part forming the final hole after the bending operation.

In an alternative embodiment of the second part, provision can be made for the second part to consist of two individual parts connected to one another in a fixed manner, wherein the two individual parts are optionally stampings. In contrast to the above-described alternative for the second part, it is possible to avoid a bending operation in the production of the second part if it is produced from two individual parts. In this case, the two individual parts can be held together by means of at least one assembly joint. The at least one assembly joint can be either a riveted joint, a screwed joint, a soldered joint, a lock-seamed joint, an adhesively bonded joint or a welded joint. The welded joint can be a laser-welded joint, an arc-welded joint, a resistance-welded joint, an electron beam-welded joint, a diffusion-welded joint or some other welded joint known in the prior art. Provision is advantageously made for the at least one assembly joint to be arranged in an area around the connection but not in the area around the guide.

This can provide the above-described advantages of cost savings and optimized positioning for assembly, setting and fixing. The at least one hole can be machined directly into one of the two individual parts, e.g. by punching the complete hole, or the two individual parts can each contain one half of the hole.

In an alternative embodiment of the second part, the second part can be a casting, a metal injection molding, a sintered part or a turned part.

The at least one hole can be drilled, punched or milled.

According to another aspect of the invention, the exhaust-gas turbocharger can comprise a turbine for driving a compressor impeller by way of a common axle or shaft. The center line of the connection hole can run substantially parallel to the axis of the turbine. As an alternative, the center line of the connection hole can run substantially perpendicular to the axis of the turbine. Any other alignment of the center line of the connection hole with respect to the axis of the turbine can also be provided.

According to another aspect of the invention, the exhaust-gas turbocharger can comprise a bypass duct for the turbine and a closing device in the bypass duct. The regulating mechanism can be suitable for at least partially opening and closing the closing device in order to regulate the flow through the bypass duct. The regulating mechanism can comprise at least one coupling device, which connects the control rod to the closing device. The closing device can comprise a flap or a valve.

According to another aspect of the invention, the actuator device can comprise an actuating means. The actuating means can comprise a hydraulic or pneumatic control capsule or an electric actuating unit. The actuating means can be attached to the housing or a housing part of the turbine and/or to the housing or a housing part of the compressor impeller.

The above-described welded or assembly joint between the first and the second part can comprise a material connection between the first part and the second part, which is formed by material that is applied and/or fused on. The material that is applied and/or fused on can extend from the first part, through the hole or holes, onto the second part.

According to another aspect of the invention, the second part, once mounted, can be arranged at least partially in a region between a housing for a turbine of the turbocharger and a housing for a compressor impeller of the turbocharger. This positioning can ensure compact construction of the turbocharger.

According to another aspect of the invention, the actuator device can be suitable for transmitting a movement and/or a force, initiated by the actuating means, via the control rod to the regulating mechanism.

According to another aspect of the present invention, an internal combustion engine comprises an embodiment of the exhaust-gas turbocharger described above.

Another aspect of the present invention describes a method for assembling and/or setting an exhaust-gas turbocharger described above, which is characterized by the following steps:

first of all, an actuating means and the first part are attached to the exhaust-gas turbocharger. The actuating means is then actuated in such a way that the first part connected to the actuating means is moved into an appropriate working position. The second part is then arranged in a predetermined position relative to the first part by longitudinal movement of the first and second parts relative to one another, using the guide of the second part, with the predetermined position being determined by the working position of the first part. Once the position has been reached, the second part is attached to the first part in the predetermined position by means of the welded or assembly joint.

These aspects and the way in which they are achieved are explained in detail in the following detailed description in conjunction with the figures.

DETAILED DESCRIPTION OF THE INVENTION

Figure 1:
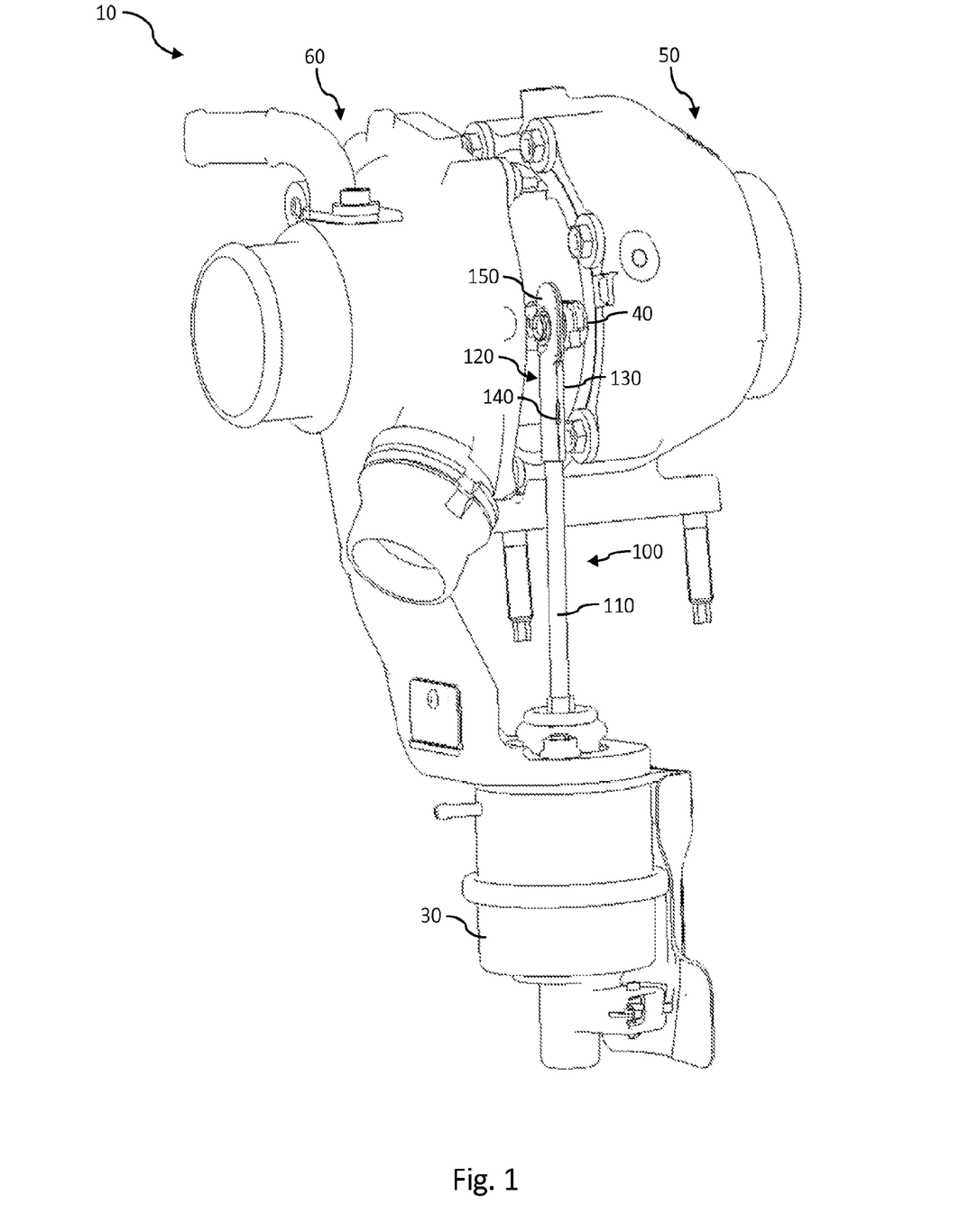
FIG. 1 shows a turbocharger according to one embodiment of the present invention.

FIG. 1 shows a turbocharger according to one embodiment of the present invention.

The exhaust-gas turbocharger 10 of the present invention is for use with an internal combustion engine. In a known manner, the turbocharger has a turbine with a turbine housing 50 and a compressor impeller with an associated housing 60. In addition, the exhaust-gas turbocharger 10 has a regulating mechanism and an actuator device 20 for actuating the regulating mechanism, the actuator device 20 having a control rod 100 with a first part 110 and a second part 120. The second part 120 of the control rod has a guide 130, which is designed in such a way that it at least partially surrounds the first part 110. Moreover, the second part 120 has at least one hole 140, the first part 110 being connected to the second part 120 by a welded or assembly joint (for a better understanding of the invention this is not shown in the figures), which is arranged in the at least one hole 140. Connecting the first part 110 to the second part 120 by means of a permanent welded joint or some other assembly joint makes it possible to prevent subsequent adjustment of the two parts relative to one another. Consequently, the original setting of the turbocharger is preserved and it is thus possible to prevent overloading of the turbocharger and the internal combustion engine.

Figure 2A:
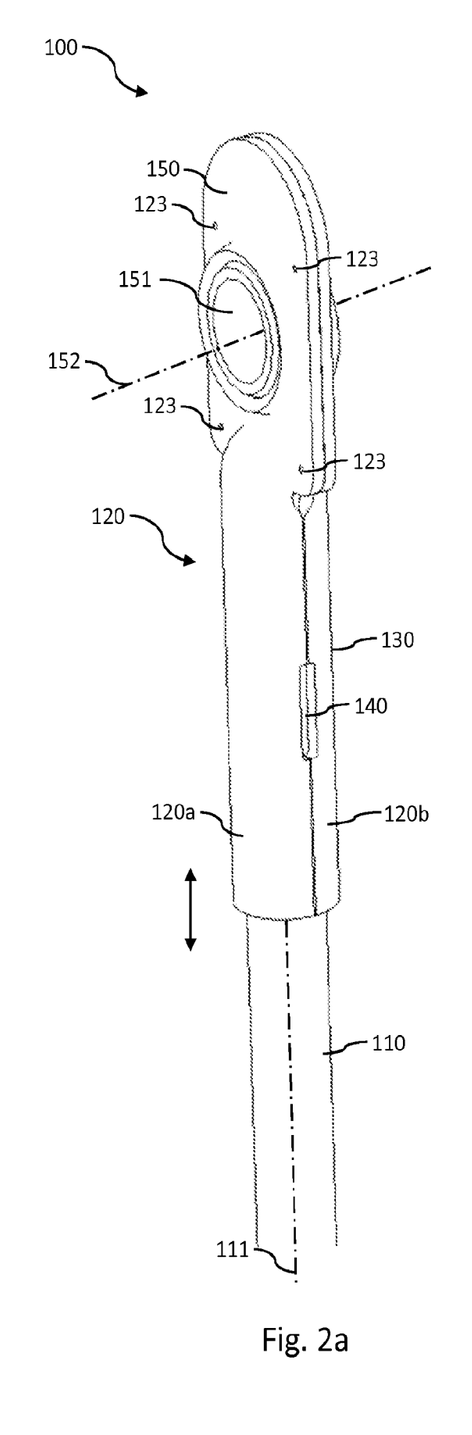
FIGS. 2a and 2b show embodiments of the control rod of a turbocharger in accordance with the present invention.
Figure 2B:
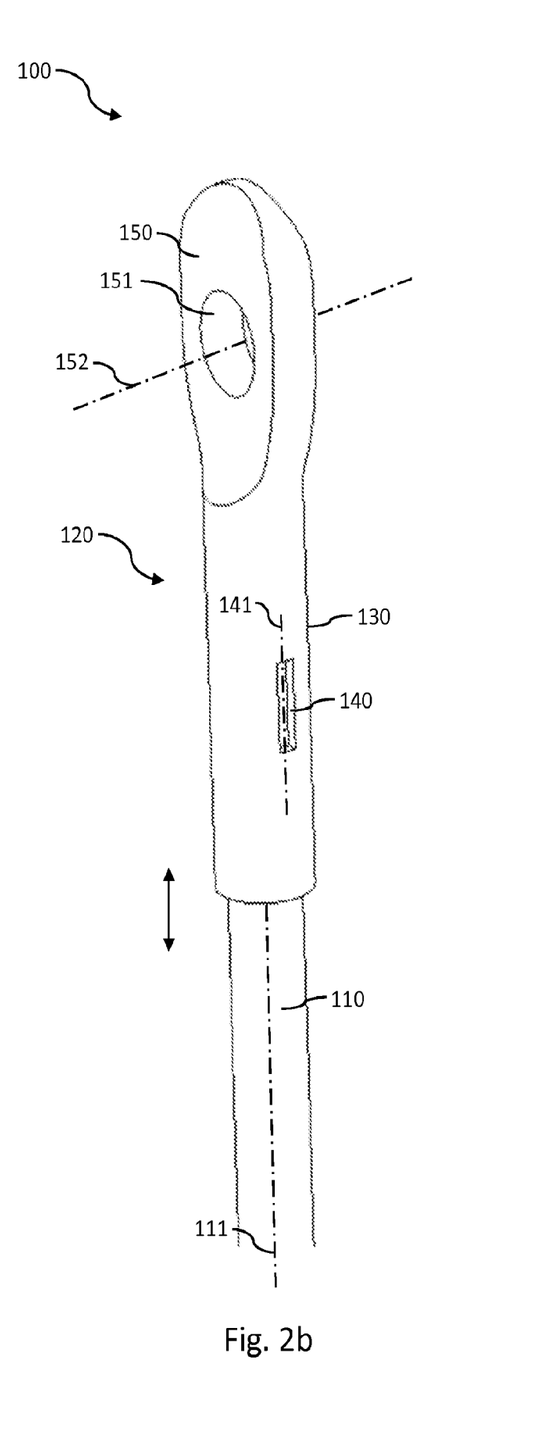

FIGS. 2a and 2b show enlarged illustrations of the control rod 100 consisting of the first part 110 and the second part 120.

As illustrated in FIGS. 2a and 2b, the at least one hole 140 can be arranged in the region of the guide 130. Depending on the embodiment, the second part 120 of the control rod 100 can also have two, three or more holes, and a welded or assembly joint can be arranged in each of the holes, or a welded or assembly joint can extend across all the holes. The holes can optionally be arranged on an axis parallel to the longitudinal axis 111 of the first part 110.

Further details relating to the hole will be described below inter alia. All the specifications which are cited for one hole can also apply in a corresponding fashion to two or more holes, even if this fact is not expressly emphasized at the respective points and is not visible in the figures.

FIGS. 2a and 2b also show the at least one hole 140 as an elongate hole. The longitudinal axis 141, shown in FIG. 2b, of the elongate hole 140 can run parallel to the longitudinal axis of the first part.

The second part 120 of the control rod 100 has a connection 150. This is used to connect the control rod 100 to other elements of the regulating mechanism, as is evident in FIG. 1. The connection 150 is situated on the opposite side of the second part 120 from the guide 130. The connection 150 has a connection hole 151 with a center line 152. Depending on the embodiment of the other elements of the regulating mechanism, the connection 150 can comprise a flexible connection or a bearing for a ball joint for purposes of attachment. In this way, it is possible to create an appropriate connection to the other elements of the regulating mechanism, e.g. a coupling device 40.

As shown in FIGS. 2a and 2b, the longitudinal axis 140 of the hole (or even just the center if the hole is not an elongate hole) lies in a plane which is perpendicular to the center line 152 through the connection hole and which contains the longitudinal axis 111 of the first part 110. By means of this arrangement of the hole or of the holes for the weld, simple and at least partially automated assembly, setting and fixing can be made possible. It is possible, for example, for a robot to perform setting and/or to apply the weld. In an alternative embodiment (not shown in the figures), the center of the hole can lie in a plane defined by the center line 152 of the connection hole 152 and the longitudinal axis 111 of the first part 110.

As shown in FIGS. 2a and 2b, the guide 130 fixes the position of the first part 110 relative to the second part 120, except for a degree of freedom parallel to the longitudinal axis 111 of the first part 110. This restricts the movement of the two parts relative to one another to translation of the first part 110 relative to the second part 120 parallel to the longitudinal axis 111 of the first part 110 (indicated by the arrows in FIGS. 2a and 2b). At the same time, the guide 130 of the second part 120 supports the first part 110 of the control rod 100. This facilitates the process of setting and fixing the two parts by means of the welded or assembly joint. As an advantageous option, the first part can be embodied as a metal sheet, a polygonal bar or a round bar. The guide can be of sleeve-shaped design, for example, with the sleeve-shaped guide optionally surrounding one region of the first part completely (see FIGS. 2a and 2b).

The second part 120 of the control rod 100 can be produced from a stamping or a stamped and bent part. In this case, the second part 120 can be produced by bending around an axis perpendicular to the longitudinal axis 111 of the first part 110. After the bending operation, the guide can be formed by an upper side and a lower side of the second part 120. As an alternative, it is also possible for the second part to be produced by bending twice around two axes that are perpendicular to one another or by bending it several times around various differently aligned axes.

In an alternative embodiment (see FIG. 2a), the second part 120 consists of two individual parts 120a and 120b connected to one another in a fixed manner, wherein the two individual parts 120a and 120b are optionally stampings. In contrast to the alternative described above for the second part 120, a bending operation can be avoided in the production of the second part 120 if it is produced from two individual parts 120a and 120b.

After the bending operation, the ends of the second part 120 are fixed to one another by means of assembly joints 123, or this is done after the two individual parts 120a and 120b of the second part 120 have been put together. FIG. 2a shows a total of four assembly joints 123. However, it is also possible in other embodiments to provide fewer, e.g. just one, or indeed more than four assembly joints. The assembly joint can be either a riveted joint, a screwed joint, a lock-seamed joint, an adhesively bonded joint, a soldered joint or a welded joint. If a welded joint is used, this can be a laser-welded joint, an arc-welded joint, a resistance-welded joint, an electron beam-welded joint, a diffusion-welded joint or some other welded joint known in the prior art. As shown in FIG. 2a, the assembly joints 123 are situated in an area around the connection but not in the area around the guide 130. On the one hand, this makes it possible to save on material for the second part, for example. On the other hand, this arrangement makes it possible to position the hole 140 at a particular location in the overall area of the guide 130 since no material or surfaces are used up for assembly joints in the area of the guide 130. In the case of a sleeve-shaped design of the guide 130, for example, the hole 140 can be positioned in any desired location along the entire circumference of the guide 130 that is optimized for the assembly, the setting and the fixing of the regulating mechanism.

If the second part is produced from a stamped and bent part, the hole 140 can be machined directly into the stamping. In this way, the production process for the second part can be simplified. In this case, the at least one hole can be fully formed even before a bending operation, by punching or drilling the complete hole, for example. As an alternative, the hole can consist of two halves, with two edge regions of the second part forming the final hole after the bending operation.

In the embodiment of the second part 120 consisting of two individual parts 120a and 120b, too, the hole can be machined directly into one of the two individual parts, e.g. by punching the complete hole, or the two individual parts can each contain one half of the hole (see FIG. 2a).

FIG. 2b shows an alternative embodiment of the second part, in which the second part is produced as a casting, a metal injection molding, a sintered part or a turned part. The hole 140 can be drilled, punched or milled, for example.

The exhaust-gas turbocharger furthermore has a turbine for driving a compressor impeller by way of a common axle or shaft. The control rod 100 of the actuator device 20 can be positioned in various ways on the turbocharger 10. For example, the center line 152 of the connection hole 151 can run substantially parallel to the axis of the turbine. As an alternative, the center line 152 of the connection hole 151 can run substantially perpendicular to the axis of the turbine. Any other alignment of the center line 152 of the connection hole 151 with respect to the axis of the turbine can also be provided.

The exhaust-gas turbocharger furthermore has a bypass duct for the turbine and a closing device in the bypass duct. Together with the regulating mechanism, the actuator device 20 is designed to at least partially open and to close the closing device in order to regulate the flow of exhaust gas from the internal combustion engine through the bypass duct. For this purpose, the regulating mechanism has a coupling device 40, which connects the control rod 100 to the closing device. The closing device can be designed as a flap or a valve.

To apply a force or to produce a movement, the actuator device has an actuating means 30. The actuating means 30 can be a hydraulic or pneumatic control capsule or an electric or electromechanical actuating unit. If, for example, a pressurized capsule is used, it is possible for the turbocharger to be self-regulating by way of one of the pressures of the working fluids (on the compressor side or the turbine side). Where other actuating means are used, it is possible to control the regulating mechanism even more precisely and, for example, to enable opening of the closing device (e.g. waste gate) even at low rotational speeds in order, for example, to preheat the exhaust catalyst. These types of actuating means can be controlled by means of a pressure sensor on the compressor or directly by means of the engine controller, for example. The actuating means 30 is attached to the housing 60 of the compressor impeller. As an alternative, it is also possible for the actuating means 30 to be attached to the housing 50 of the turbine or to both housings 50, 60 or to the internal combustion engine.

The above-described welded or assembly joint between the first and the second part 110, 120 produces a material connection between the first part 110 and the second part 120, which is formed by material that is applied and/or fused on. The material that is applied and/or fused on can extend from the first part 110, through the hole 140 or holes, onto the second part 120.

According to another aspect of the invention, the second part 120, once mounted, can be arranged at least partially in a region between the housing 50 for the turbine of the turbocharger and the housing 60 for the compressor impeller of the turbocharger (see FIG. 1). This positioning allows a compact turbocharger construction.

During the operation of the turbocharger 10, the actuator device 20 transmits a movement and/or a force, initiated by the actuating means 30, via the control rod 100 to the regulating mechanism.

The control rod 100 and the components coupled thereto are preferably produced from metallic materials. As an alternative, it would also be possible to produce these components, at least in part, from heat-resistant plastics and/or composite materials.

For use in motor vehicles, the turbocharger shown in FIG. 1 is coupled to an internal combustion engine. Coupling can be accomplished in various ways and in combination with different internal combustion engines.

A method for assembling and/or setting the above-described exhaust-gas turbocharger shown in FIG. 1 is described below:

First of all, the actuating means 30 and at least the first part 110 of the control rod 100 are attached to the exhaust-gas turbocharger 10. At this point in time, the first part 110 of the control rod 120 can be moved in the guide 130 of the second part 120. This enables the first part 110 of the control rod 100 to be moved by the actuating means 30 to any desired axial position relative to the guide 130. By actuation of the actuating means 30, the first part 110, which is connected to the actuating means 30, is moved into an appropriate working position. Based on this working position, the second part 120 is arranged in a predetermined position. This is accomplished by longitudinal movement (see arrows in FIGS. 2a and 2b) of the second part 120 relative to the first part 110, using the guide 130 of the second part 120. After alignment, the second part 120 is fixed in the predetermined position on the first part 110 by means of the welded or assembly joint. A welded joint, for example, can be applied very quickly and in an automated manner, e.g. by resistance welding by a robot. As an alternative, a flared joint, for example, can be provided as an assembly joint. However, the first part 110 and the second part 120 of the control rod 100 can also be fixed by any other welding method, by a soldering method or even by an adhesive bonding method. All that need be ensured is that the joint cannot be undone (without destroying the components), thereby making it possible to prevent unauthorized release of the joint to change the setting of the exhaust-gas turbocharger or making it very easy to prove that this has taken place. Enhanced safety against interference is thereby guaranteed, and warranty claims can be prevented.

Although the present invention has been described above and is defined in the attached claims, it should be understood that the invention can also alternatively be defined in accordance with the following embodiments:

1. An exhaust-gas turbocharger for use with an internal combustion engine, comprising:
    a regulating mechanism; and
    an actuator device for actuating the regulating mechanism, wherein the actuator device comprises a control rod with a first part and a second part,
    wherein the second part has a guide, which is designed in such a way that it at least partially surrounds the first part, wherein the second part has at least one hole, wherein the first part is connected to the second part by a welded or assembly joint, which is arranged in the at least one hole.
2. The exhaust-gas turbocharger according to embodiment 1, wherein the at least one hole is arranged in the region of the guide.
3. The exhaust-gas turbocharger according to embodiment 1 or 2, wherein the second part comprises at least two holes, and a welded or assembly joint is arranged in each of the holes, or a welded or assembly joint extends across all the holes, with the at least two holes optionally being arranged on an axis parallel to the longitudinal axis of the first part.
4. The exhaust-gas turbocharger according to one of the preceding embodiments, wherein the at least one hole is an elongate hole.
5. The exhaust-gas turbocharger according to embodiment 4, wherein the longitudinal axis of the elongate hole runs parallel to the longitudinal axis of the first part.
6. The exhaust-gas turbocharger according to one of the preceding embodiments, wherein the second part comprises a connection.
7. The exhaust-gas turbocharger according to embodiment 6, wherein the connection is arranged on the opposite side of the second part from the guide.
8. The exhaust-gas turbocharger according to one of embodiments 5 or 6, wherein the connection has a connection hole with a center line.
9. The exhaust-gas turbocharger according to embodiment 8, wherein the center of the hole or the centers of the holes lies/lie in a plane defined by the center line of the connection hole and the longitudinal axis of the first part.
10. The exhaust-gas turbocharger according to embodiment 8, wherein the center of the hole or the centers of the holes lies/lie in a plane which is perpendicular to the center line through the connection hole and which contains the longitudinal axis of the first part.
11. The exhaust-gas turbocharger according to one of the preceding embodiments, wherein the guide fixes the position of the first part relative to the second part, except for a degree of freedom parallel to the longitudinal axis of the first part.
12. The exhaust-gas turbocharger according to one of the preceding embodiments, wherein the first part is a metal sheet, a polygonal bar or a round bar.
13. The exhaust-gas turbocharger according to one of the preceding embodiments, wherein the guide is of sleeve-shaped design, with the sleeve-shaped guide optionally surrounding one region of the first part completely.
14. The exhaust-gas turbocharger according to one of embodiments 1 to 13, wherein the second part is produced from a stamping or a stamped and bent part.
15. An internal combustion engine, wherein the internal combustion engine comprises an exhaust-gas turbocharger according to one of embodiments 1 to 14.
16. A method for assembling and/or setting an exhaust-gas turbocharger according to one of embodiments 1 to 14, which is characterized by the following steps:
  attaching an actuating means and the first part to the exhaust-gas turbocharger;
  actuating the actuating means in such a way that the first part connected to the actuating means is moved into an appropriate working position;
  arranging the second part in a predetermined position relative to the first part by longitudinal movement of the first and second parts relative to one another, using the guide of the second part, with the predetermined position being determined by the working position of the first part;
  attaching the second part to the first part in the predetermined position by means of the welded or assembly joint.
17. The exhaust-gas turbocharger according to embodiment 14, wherein the second part is produced by bending around an axis perpendicular to the longitudinal axis of the first part.
18. The exhaust-gas turbocharger according to embodiment 17, wherein, after the bending operation, the guide is formed by an upper side and a lower side of the second part.
19. The exhaust-gas turbocharger according to embodiment 14, wherein the second part is produced by bending twice around two axes that are perpendicular to one another.
20. The exhaust-gas turbocharger according to one of embodiments 14 or 17 to 19, wherein, after the bending operation, the second part is fixed by means of at least one assembly joint.
21. The exhaust-gas turbocharger according to embodiment 20, wherein the assembly joint is either a riveted joint, a screwed joint, a lock-seamed joint, an adhesively bonded joint, a soldered joint or a welded joint.
22. The exhaust-gas turbocharger according to embodiment 21, wherein the welded joint is a laser-welded joint, an arc-welded joint, a resistance-welded joint, an electron beam-welded joint or a diffusion-welded joint.
23. The exhaust-gas turbocharger according to one of embodiments 20 to 22, wherein the at least one assembly joint is arranged in an area around the connection but not in the area around the guide.
24. The exhaust-gas turbocharger according to one of embodiments 14 or 17 to 23, wherein the at least one hole is machined directly into the stamping.
25. The exhaust-gas turbocharger according to embodiment 24, wherein the at least one hole is fully formed even before a bending operation, by punching or drilling the complete hole, for example.
26. The exhaust-gas turbocharger according to embodiment 24, wherein the at least one hole consists of two halves, with two edge regions of the second part forming the final hole after the bending operation.
27. The exhaust-gas turbocharger according to one of embodiments 1 to 14, wherein the second part consists of two individual parts connected to one another in a fixed manner, wherein the two individual parts are optionally stampings.
28. The exhaust-gas turbocharger according to embodiment 27, wherein the two individual parts are held together by means of at least one assembly joint.
29. The exhaust-gas turbocharger according to embodiment 28, wherein the at least one assembly joint is either a riveted joint, a screwed joint, a soldered joint, a lock-seamed joint, an adhesively bonded joint or a welded joint.
30. The exhaust-gas turbocharger according to embodiment 29, wherein the welded joint is a laser-welded joint, an arc-welded joint, a resistance-welded joint, an electron beam-welded joint or a diffusion-welded joint.
31. The exhaust-gas turbocharger according to one of embodiments 28 to 30, wherein the at least one assembly joint is arranged in an area around the connection but not in the area around the guide.

32. The exhaust-gas turbocharger according to one of embodiments 27 to 31, wherein the at least one hole is machined directly into one of the two individual parts, e.g. by punching the complete hole.
33. The exhaust-gas turbocharger according to one of embodiments 27 to 31, wherein the two individual parts each contain one half of the hole.
34. The exhaust-gas turbocharger according to one of embodiments 1 to 13, wherein the second part is a casting, a metal injection molding, a sintered part or a turned part.
35. The exhaust-gas turbocharger according to one of embodiments 1 to 13 or 16 to 34, wherein the at least one hole is drilled, punched or milled.
36. The exhaust-gas turbocharger according to one of embodiments 6 to 14 or 17 to 34, wherein the connection comprises a flexible connection or a bearing for a ball joint.
37. The exhaust-gas turbocharger according to one of embodiments 1 to 14 or 17 to 34, wherein the exhaust-gas turbocharger comprises a turbine for driving a compressor impeller by way of a common axle.
38. The exhaust-gas turbocharger according to embodiment 37, wherein the center line of the connection hole runs substantially parallel to the axis of the turbine.
39. The exhaust-gas turbocharger according to embodiment 37, wherein the center line of the connection hole runs substantially perpendicular to the axis of the turbine.
40. The exhaust-gas turbocharger according to one of embodiments 1 to 14 or 17 to 39, wherein the exhaust-gas turbocharger comprises a bypass duct for the turbine and a closing device in the bypass duct.
41. The exhaust-gas turbocharger according to embodiment 40, wherein the regulating mechanism is suitable for at least partially opening and closing the closing device in order to regulate the flow through the bypass duct.
42. The exhaust-gas turbocharger according to one of embodiments 40 or 41, wherein the regulating mechanism comprises at least one coupling device, which connects the control rod to the closing device.
43. The exhaust-gas turbocharger according to one of embodiments 40 to 42, wherein the closing device comprises a flap or a valve.
44. The exhaust-gas turbocharger according to one of embodiments 1 to 14 or 17 to 43, wherein the actuator device comprises an actuating means.
45. The exhaust-gas device according to embodiment 44, wherein the actuating means comprises a hydraulic or pneumatic control capsule or an electric actuating unit.
46. The exhaust-gas device according to either of embodiments 44 and 45, wherein the actuating means is attached to a housing of the turbine.
47. The exhaust-gas device according to either of embodiments 44 and 45, wherein the actuating means is attached to a housing of the compressor impeller.
48. The exhaust-gas turbocharger according to one of embodiments 1 to 14 or 17 to 47, wherein the welded or assembly joint comprises a material connection between the first part and the second part, which is formed by material that is applied and/or fused on.
49. The exhaust-gas turbocharger according to embodiment 48, wherein the material that is applied and/or fused on extends from the first part, through the hole or holes, onto the second part.
50. The exhaust-gas turbocharger according to one of embodiments 1 to 14 or 17 to 49, wherein the second part is arranged at least partially in a region between a housing for a turbine of the turbocharger and a housing for a compressor impeller of the turbocharger.
51. The exhaust-gas turbocharger according to one of embodiments 44 to 50, wherein the actuator device is suitable for transmitting a movement and/or a force, initiated by the actuating means, via the control rod to the regulating mechanism.

The invention claimed is:
1. An exhaust-gas turbocharger for use with an internal combustion engine, comprising:
a regulating mechanism; and
an actuator device for actuating the regulating mechanism, wherein the actuator device comprises a control rod with a first part and a second part,
wherein the second part has a guide, which is designed in such a way that it at least partially surrounds the first part,
wherein the second part comprises a first section and a second section, the first section and the second section being connected to each other by connection joints, which are located in an area around a connection and away from the guide such that there are no connection joints around the guide, and
wherein the second part has at least one hole, wherein the first part is connected to the second part by a welded or assembly joint, which is arranged in the at least one hole.
2. The exhaust-gas turbocharger as claimed in claim 1, wherein the at least one hole is arranged in the region of the guide.
3. The exhaust-gas turbocharger as claimed in claim 1, wherein the second part comprises at least two holes, and a welded or assembly joint is arranged in each of the holes, or a welded or assembly joint extends across all the holes, with the at least two holes optionally being arranged on an axis parallel to a longitudinal axis of the first part.
4. The exhaust-gas turbocharger as claimed in claim 1, wherein the at least one hole is an elongate hole.
5. The exhaust-gas turbocharger as claimed in claim 4, wherein a longitudinal axis of the elongate hole runs parallel to the longitudinal axis of the first part.
6. The exhaust-gas turbocharger as claimed in claim 1, wherein the first section of the second part comprises a first portion of the at least one hole and the second section of the second part comprises a second portion of the at least one hole.
7. The exhaust-gas turbocharger as claimed in claim 6, wherein the connection is arranged on the opposite side of the second part from the guide.
8. The exhaust-gas turbocharger as claimed in claim 5, wherein the connection has a connection hole with a center line.
9. The exhaust-gas turbocharger as claimed in claim 8, wherein the center of the hole or the centers of the holes lies/lie in a plane defined by the center line of the connection hole and the longitudinal axis of the first part.
10. The exhaust-gas turbocharger as claimed in claim 8, wherein the center of the hole or the centers of the holes lies/lie in a plane which is perpendicular to the center line through the connection hole and which contains the longitudinal axis of the first part.
11. The exhaust-gas turbocharger as claimed in claim 1, wherein the guide fixes the position of the first part relative to the second part, except for a degree of freedom parallel to the longitudinal axis of the first part.

12. The exhaust-gas turbocharger as claimed in claim 1, wherein the first part is a metal sheet, a polygonal bar or a round bar.

13. The exhaust-gas turbocharger as claimed in claim 1, wherein the guide is of sleeve-shaped design, with the sleeve-shaped guide optionally surrounding one region of the first part completely.

14. The exhaust-gas turbocharger as claimed in claim 1, wherein the second part is produced from a stamping or a stamped and bent part.

15. An internal combustion engine, wherein the internal combustion engine comprises an exhaust-gas turbocharger as claimed in claim 1.

16. A method for assembling and/or setting an exhaust-gas turbocharger as claimed in claim 1, comprising:
- attaching an actuating device to the exhaust-gas turbocharger, the actuating device comprising a control rod with a first part and a second part,
  - wherein the second part has a guide, which is designed in such a way that it at least partially surrounds the first part, and
  - wherein the second part comprises a first section and a second section, the first section and the second section being connected to each other by connection joints, which are located in an area around a connection and away from the guide such that there are no connection joints around the guide;
- actuating the actuating device in such a way that the first part connected to the actuating means is moved into an appropriate working position;
- arranging the second part in a predetermined position relative to the first part by longitudinal movement of the first and second parts relative to one another, using the guide of the second part, with the predetermined position being determined by the working position of the first part; and
- attaching the second part to the first part in the predetermined position by means of the welded or assembly joint.

\* \* \* \* \*